US007802630B2

(12) United States Patent
Combs et al.

(10) Patent No.: US 7,802,630 B2
(45) Date of Patent: Sep. 28, 2010

(54) FIRE-FIGHTING MONITOR

(75) Inventors: Eric Nathaniel Combs, Goshen, IN (US); Todd Brian Lozier, Elkhart, IN (US)

(73) Assignee: Elkhart Brass Manufacturing Company, Inc., Elkhart, IN (US)

( * ) Notice: Subject to any disclaimer, the term of this patent is extended or adjusted under 35 U.S.C. 154(b) by 0 days.

(21) Appl. No.: 12/163,330

(22) Filed: Jun. 27, 2008

(65) Prior Publication Data

US 2009/0000795 A1 Jan. 1, 2009

Related U.S. Application Data

(60) Provisional application No. 60/947,188, filed on Jun. 29, 2007.

(51) Int. Cl.
*A62C 25/00* (2006.01)
*B05B 15/08* (2006.01)
*B05B 15/06* (2006.01)
*F16L 27/04* (2006.01)
*F16L 27/06* (2006.01)
*A62C 27/00* (2006.01)

(52) U.S. Cl. .................. 169/52; 239/587.2; 239/587.3; 239/587.4; 285/261; 285/263

(58) Field of Classification Search .................. 169/24, 169/25, 51, 52, 54, 70, 91; 239/200, 273, 239/279–281, 587.1–588; 285/261, 263, 285/264
See application file for complete search history.

(56) References Cited

U.S. PATENT DOCUMENTS 167,505 A 9/1875 Crawford
557,799 A 4/1896 Gorter
978,107 A 12/1910 Berry
1,599,907 A 9/1926 MacGregor
1,665,810 A 4/1928 Gillick
2,111,553 A 3/1938 Chew
2,342,757 A 2/1944 Roser
3,106,247 A 10/1963 Lacks et al.

(Continued)

FOREIGN PATENT DOCUMENTS

DE 1425515 3/1963

(Continued)

OTHER PUBLICATIONS

International Search Report and Written Opinion from corresponding Patent Cooperation Treaty Application No. PCT/US2008/068594, dated Sep. 25, 2008, which corresponds to U.S. Appl. No. 12/163,330.

*Primary Examiner*—Darren W Gorman
(74) *Attorney, Agent, or Firm*—Van Dyke, Gardner, Linn & Burkhart, LLP

(57) ABSTRACT

A fire-fighting monitor includes a base, an outlet, and a plurality of jointed hollow members forming a flexible body. The hollow members are pivotably coupled together and extend between the base and the outlet to provide a flexible fluid path. A base-end hollow member is coupled to the base, and an outlet-end hollow member is coupled to the outlet. Each of the hollow members has a ball portion and a socket portion, with the socket portions adapted to receive the ball portions and form a seal therebetween. Optionally, a drive unit may be incorporated into the base for rotatably driving the fire-fighting monitor.

22 Claims, 5 Drawing Sheets

U.S. PATENT DOCUMENTS

| | | | |
|---|---|---|---|
| 4,350,297 | A | 9/1982 | Martin |
| 4,392,618 | A | 7/1983 | Evans et al. |
| 4,506,738 | A | 3/1985 | Evans et al. |
| 4,674,686 | A | 6/1987 | Trapp |
| 4,697,742 | A | 10/1987 | Schnipke |
| 4,793,557 | A | 12/1988 | Marchese et al. |
| 5,249,632 | A | 10/1993 | Sparling et al. |
| 5,425,505 | A | 6/1995 | Jones |
| 5,488,995 | A | 2/1996 | Kuwahara |
| 6,095,801 | A | 8/2000 | Spiewak |
| 6,305,621 | B1 | 10/2001 | Kolacz et al. |
| 2003/0062424 | A1 | 4/2003 | McKinney et al. |
| 2009/0277656 | A1 | 11/2009 | Combs |

FOREIGN PATENT DOCUMENTS

| | | | |
|---|---|---|---|
| DE | 1945523 | | 9/1969 |
| DE | 1952689 | | 10/1969 |
| DE | 6940725 | | 10/1969 |
| DE | 29600355 | U1 | 1/1996 |
| DE | 19600894 | A1 | 7/1997 |
| GB | 485161 | | 5/1938 |
| JP | 42-7756 | | 4/1942 |
| JP | 42-7757 | | 4/1942 |
| JP | 55-146158 | | 10/1980 |
| JP | 01297084 | | 9/1989 |
| JP | 06031009 | | 2/1994 |
| KR | 1020070021983 | | 2/2007 |
| WO | 9725104 | | 7/1997 |

FIRE-FIGHTING MONITOR

CROSS REFERENCE TO RELATED APPLICATION

The present invention claims the benefit of U.S. provisional application Ser. No. 60/947,188, filed Jun. 29, 2007, which is hereby incorporated herein by reference in its entirety.

FIELD OF THE INVENTION

The present invention is directed to a fire-fighting monitor and, more specifically, to a fire-fighting monitor that is flexible and configurable into a compact stowage configuration.

BACKGROUND OF THE INVENTION

Fire-fighting monitors are used to direct the flow of water or other fire-fighting fluid and include an inlet, which is connected to a hose or pipe, and a discharge outlet to which a nozzle or stream-shaper is mounted. Monitors are typically mounted to fire-fighting vehicles and/or aerial ladders and deliver a large quantity of fluid (typically water or foam) either directly to a fire, or to a fire via a hose or other conduit. Typical monitors are made up of curved and straight pipes or conduits, some of which may be rotatably or rigidly mounted to one another, and commonly include curves in different directions, which reduces flow efficiency. Therefore, typical monitors provide limited directional control over the fluid that they convey, by rotating about a single vertical pivot axis and pivoting about one or two horizontal axes for elevational change, and can significantly reduce the fluid flow energy by causing abrupt or multiple changes in flow direction. Typical monitors may also include a relatively large number of different parts, adding cost and complexity. Further, because monitors typically have little flexibility, they occupy a relatively large amount of horizontal and vertical space when not in use, and can exhibit a large swing radius when rotated. Thus, typical monitors may prevent vehicles to which they are attached from being stored in certain garages or from passing through low-clearance areas, and may reduce the space available for other equipment in the vicinity of the monitor, for example. Therefore, there is a need to provide a monitor having improved flexibility and reduced proportions when stowed.

SUMMARY OF THE INVENTION

Accordingly, the present invention provides a fire-fighting monitor that is adapted to flex along a substantial portion of its length to control the direction of fluid flow through the monitor, to provide an efficient fluid path through the monitor, to require a relatively small stowage space, and to do so with a relatively simple and inexpensive design.

In one form of the invention, a fire-fighting monitor includes a base, an outlet, a plurality of hollow members, and one or more joints at the hollow members. The hollow members are connected in series between the base and the outlet to provide a flexible fluid path, and include a base-end hollow member, which is coupled to the base, and an outlet-end hollow member, which forms the outlet. Each of the hollow members has a ball portion and a socket portion, with the socket portions adapted to receive the ball portions.

In one aspect, the joints of the fire-fighting monitor include hinges or ball-joints.

In another aspect, the fire-fighting monitor comprises a seal at each of the socket portions of the hollow members. The seals engage the ball portions of the hollow members to provide a substantially fluid-tight seal between adjacent hollow members.

In yet another aspect, the fire-fighting monitor further incorporates an actuator having a first end coupled to the base and a second end coupled to the outlet. The actuator is actuatable to move the outlet relative to the base.

In still another aspect, the fire-fighting monitor further comprises rotary actuators at the joints for moving the outlet relative to the base.

In a further aspect, the base of the fire-fighting monitor is rotatable, and may be drivable by a powered drive unit, for example.

In another form of the invention, a fire-fighting monitor includes two or more hollow members pivotally connected to one another in series between a base and an outlet. An actuator is coupled between the base and the outlet, whereby actuating the actuator pivots the hollow members and repositions the outlet relative to the base.

In one aspect, the actuator is actuatable so that the outlet is substantially aligned with the base to define a substantially straight fluid path, and is further actuatable to form a curved fluid path. Optionally, the actuator is actuatable until the outlet is oriented at least about 135 degrees from the base.

In another aspect, the outlet is repositionable to form either a straight fluid path through the monitor, or a curved fluid path through the monitor.

In still another aspect, each hollow member is pivotable about a pivot axis relative to an adjacent hollow member, wherein the pivot axes of the hollow members are substantially parallel to one another.

Accordingly, the monitor of the present invention provides a monitor with improved flexibility, higher flow-efficiency, smaller stowage size, and relatively low complexity.

These and other objects, advantages, purposes, and features of the invention will become more apparent from the study of the following description taken in conjunction with the drawings.

DETAILED DESCRIPTION OF THE PREFERRED EMBODIMENT

Figure 1:
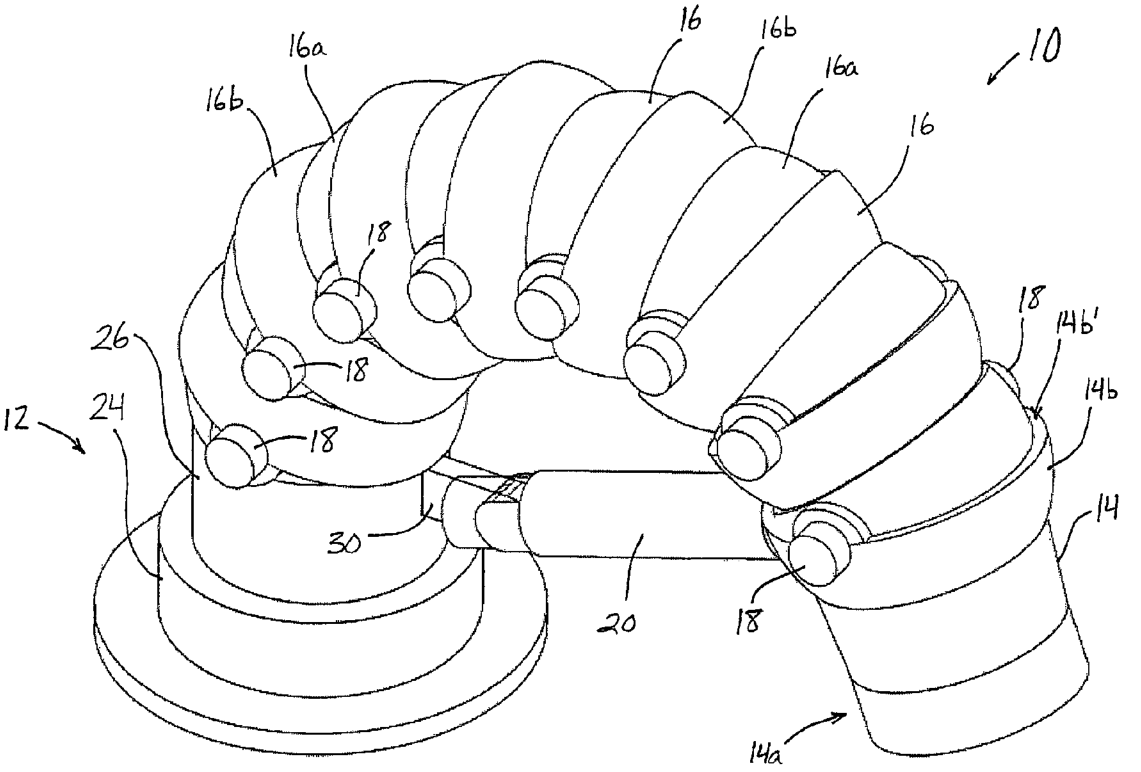
FIG. 1 is a perspective view of a monitor of the present invention in a stowage configuration.

Referring to FIG. 1, the numeral 10 generally designates a fire-fighting monitor of the present invention. As will be more fully described below, monitor 10 is adapted to exhibit increased flexibility, an efficient fluid path, and a compact stowage configuration.

Referring to FIGS. 1-4, monitor 10 includes a base 12 defining an inlet, an outlet 14, and a plurality of hollow members 16 arranged in series between base 12 and outlet 14. Each hollow member 16 is coupled or connected to an adjacent hollow member 16 via a pair of joints 18, each pair of joints providing a pivot axis. Additionally, one hollow member is coupled or connected to base 12 and another hollow member is coupled or connected to a hollow member configured as an outlet 14 to thereby form a flexible monitor body that extends from the base to the outlet.

Figure 5:
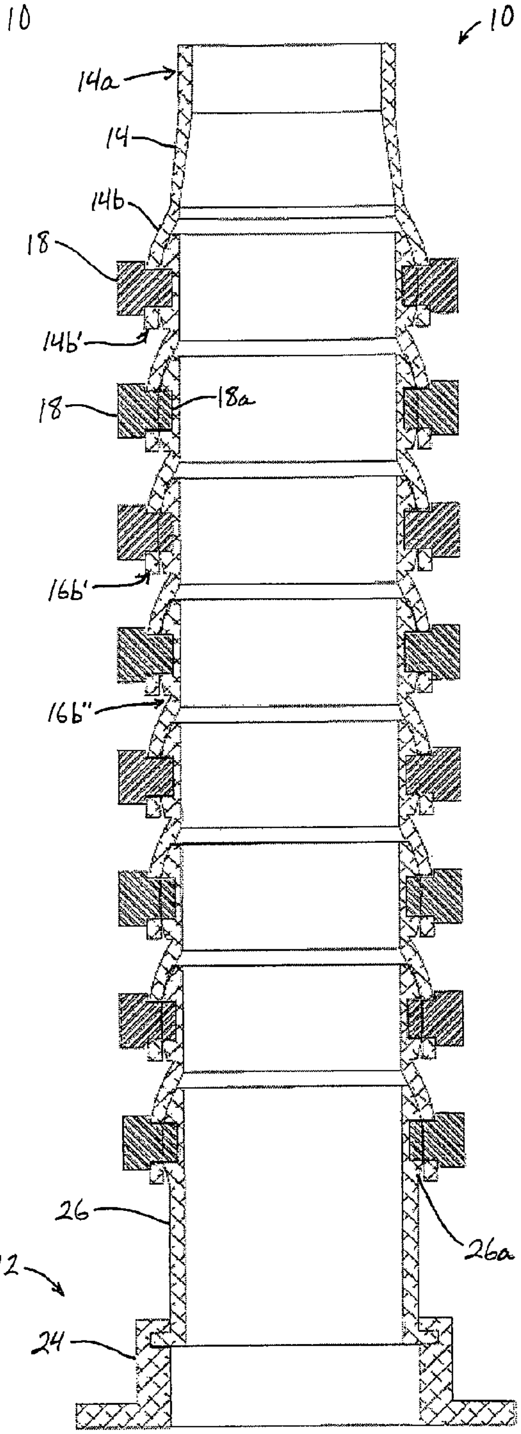
FIG. 5 is a sectional view of the monitor taken along the section designated V-V in FIG. 4.
Figure 6:
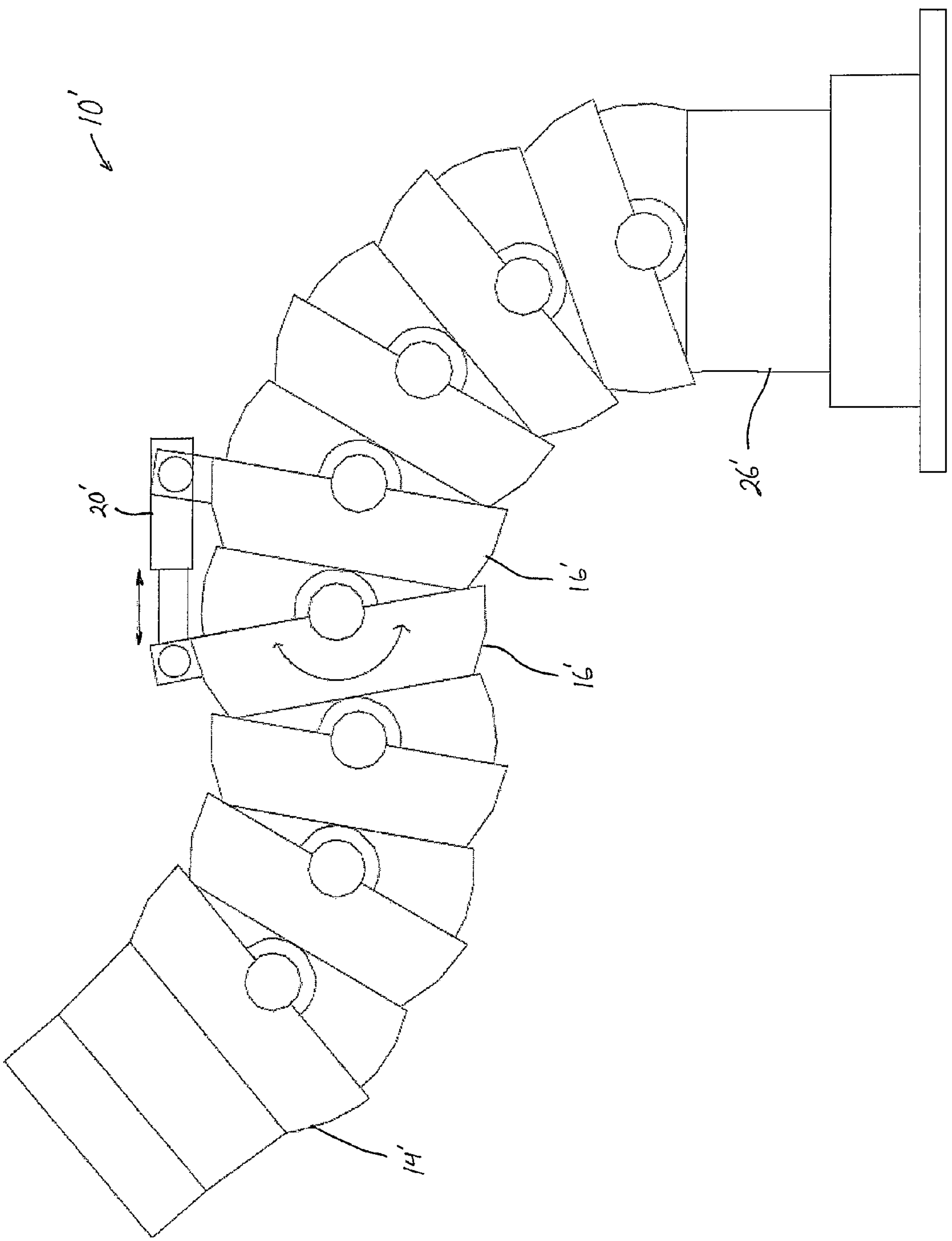
FIG. 6 is a side elevation of the monitor defining a two-curve fluid path and having a segment actuator.

Thus, the hollow members are pivotally mounted to one another in series about a plurality of pivot axes to form a straight fluid path (FIGS. 4 and 5) or a fluid path with a single bend (FIGS. 1-3), although as will be more fully described below, monitor 10 is not limited to straight or single-curve fluid paths, and may be configured to form two or more curves or bends (FIG. 6). Further, the pivot axes formed by joints 18 are generally parallel such that a single actuator may be used to reconfigure the flexible monitor body and further reposition the outlet. Optionally, an actuator 20 may be provided to control the vertical or elevational aiming of outlet 14 of monitor 10.

Figure 3:
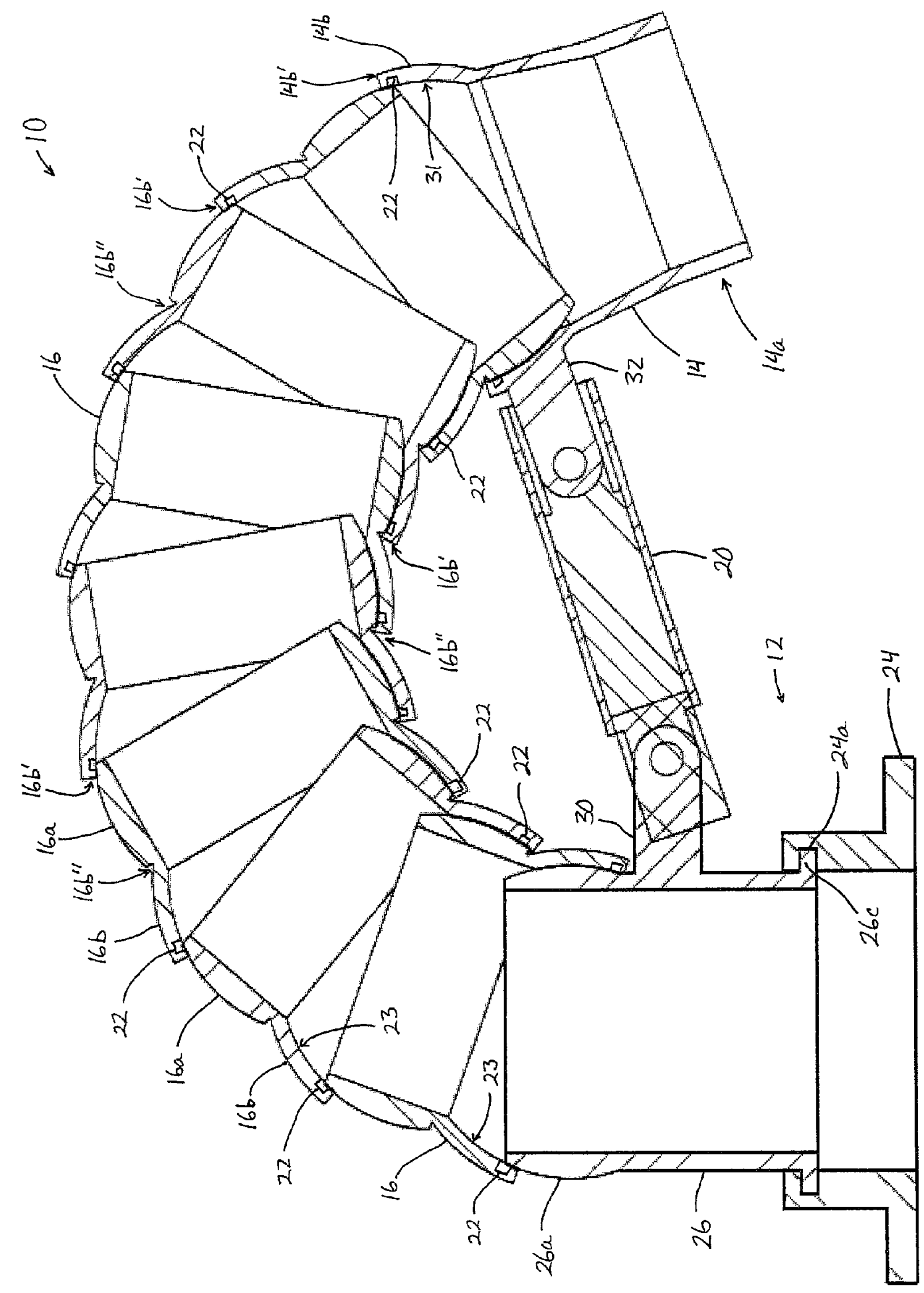
FIG. 3 is a cross-section view of the monitor of FIG. 2.

As best seen in FIG. 3, hollow members 16 include ball portions 16*a* and socket portions 16*b*. Each ball portion 16*a* has an arcuate outer surface whose center of curvature is offset from the center of curvature of the arcuate surface of the corresponding socket portion 16*b* of a given hollow member 16. Further, the arcuate surface of each ball portion abuts or is adjacent the arcuate surface of its respective socket portion so that the juncture of the two arcuate surfaces forms a limit or stop, as described below.

Socket portion 16*b* of a given hollow member is adapted to receive ball portion 16*a* of an immediately adjacent hollow member to provide a nested or overlapping arrangement between each adjacent hollow member. As best seen in FIG. 3, the degree of flex of monitor 10 is limited when a terminal edge 16*b*' of the socket portion 16*b* of one hollow member abuts a base 16*b*" of the arcuate surface of the socket portion 16*b* of an adjacent hollow member 16, which acts as a stop or limiter. Similarly, the degree of flex of monitor 10 is limited when a terminal edge 14*b*' of socket portion 14*b* of outlet 14 contacts the base 16*b*" of socket portion 16*b* of the adjacent hollow member 16. Annular seals 22 (FIG. 3) may be provided and located in grooves at inner surfaces 23 of socket portions 16*b* to form a substantially fluid-tight seal between socket portions 16*b* and ball portions 16*a*. For a further example of ball-and-socket connections in fire-fighting monitors, see U.S. patent application Ser. No. 10/962,271, which is commonly owned by Elkhart Brass Manufacturing Company, Inc. of Elkhart, Ind., and which is hereby incorporated herein by reference in its entirety.

Base 12 includes an annular base flange 24 and a base member 26 coupled to the base flange. Base flange 24 is coupled to a fluid pressure source, such as a fire-fighting vehicle, and holds base member 26 in a longitudinally fixed position relative to the pressure source. Base member 26 includes a ball portion 26*a* having substantially the same outer dimensions as ball portions 16*a* of hollow members 16, and is therefore configured for socket portion 16*b* of the hollow member 16 located at the base end of monitor 10 to be disposed thereon. Further, base member 26 includes a mounting element 30 that extends radially outward from base member 26 for receiving actuator 20. A mounting flange 26*c* of base member 26 is cooperatively received in a corresponding annular channel 24*a* of base flange 24 to fasten base member 26 thereto.

Base member 26 may be rotatable relative to base flange 24 to facilitate control over the flow direction of fire-fighting fluid out of outlet 14. For example, ball bearings or a bushing may be provided between base member 26 and base flange 24, to facilitate rotation and directional aiming of base member 26. Optionally, a tubular sleeve or hollow cylinder, such as a sleeve made of a polytetrafluoroethylene (PTFE) or other resinous material, may be inserted between base member 26 and base flange 24, to facilitate rotation of base member 26. Optionally, the base flange may include a latch mechanism for removably attaching the monitor to a fire-fighting vehicle or other mounting surface, such as the latch mechanism described in commonly assigned U.S. Pat. No. 6,786,426, which is hereby incorporated herein by reference in its entirety.

As noted above, outlet 14 includes a socket portion 14*b* for receiving the ball portion of the hollow member that is at the outlet end of monitor 10. An annular seal 22 is also included at an inner surface 31 of socket portion 14*b* of outlet 14 to provide a fluid-tight seal between socket portion 14*b* and ball portion 16*a*. Outlet 14 further incorporates a threaded end portion 14*a* for mounting a nozzle 28 (shown in phantom in FIG. 2) to monitor 10, or for threadably receiving a conduit such as a hose or pipe. Outlet 14 also includes an actuator mounting element 32 for receiving actuator 20, described below.

Figure 2:
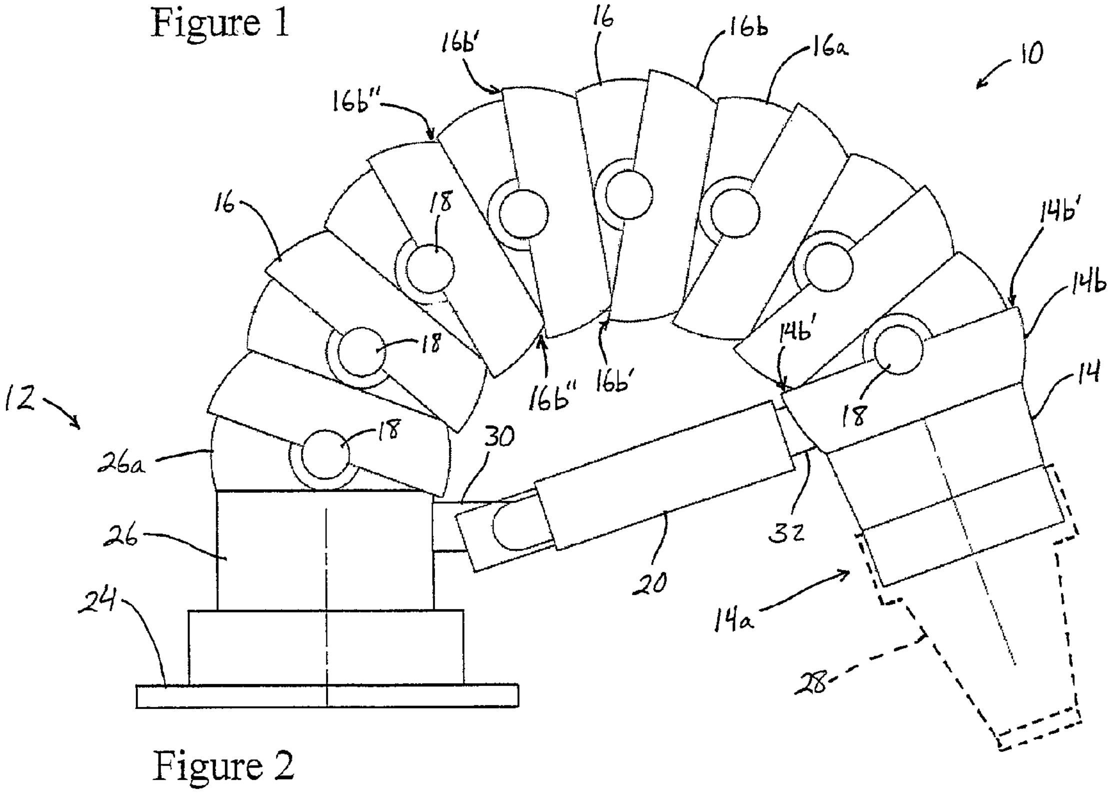
FIG. 2 is a side elevation of the monitor of FIG. 1.

Joints 18 are provided at opposite sides of socket portions 16*b* and socket portion 14*b*, as best seen in FIGS. 1, 2, and 5. Each joint 18 forms a pivotable connection between socket portion 16*b* and ball portion 16*a*, or between socket portion 14*b* and ball portion 16*a*. Joints 18 also connect the hollow member closest to base 12 to ball portion 26*a* of base member 26. Joints 18 may comprise, for example, ball-and-socket joints, pin-and-bore joints, or the like. In the illustrated embodiment, joints 18 are pivot bolts having generally cylindrical pivot portions 18*a* that are received by bores in socket portions 16*b* and cavities in ball portions 16*a* (FIG. 5). To facilitate connection of joints 18 to hollow members 16, distal end portions of pivot portions 18*a* may be threaded for engaging corresponding threads in the cavities of ball portions 16*a*, while proximal end portions of pivot portions 18*a* may be smooth for pivoting within smooth bores of socket portions 16*b*. Alternatively, proximal end portions of pivot portions 18*a* may be threaded for engaging corresponding threads in the bores of socket portions 16*b*, while distal end portions of pivot portions 18*a* may be smooth for pivoting within smooth cavities in ball portions 16*a*. For an example of a joint incorporating a one-way clutch that may be useful with the present invention, see U.S. patent application Ser. No. 10/962,271, which is commonly assigned to Elkhart Brass Manufacturing Company, Inc., and which is hereby incorporated herein by reference in its entirety.

Figure 4:
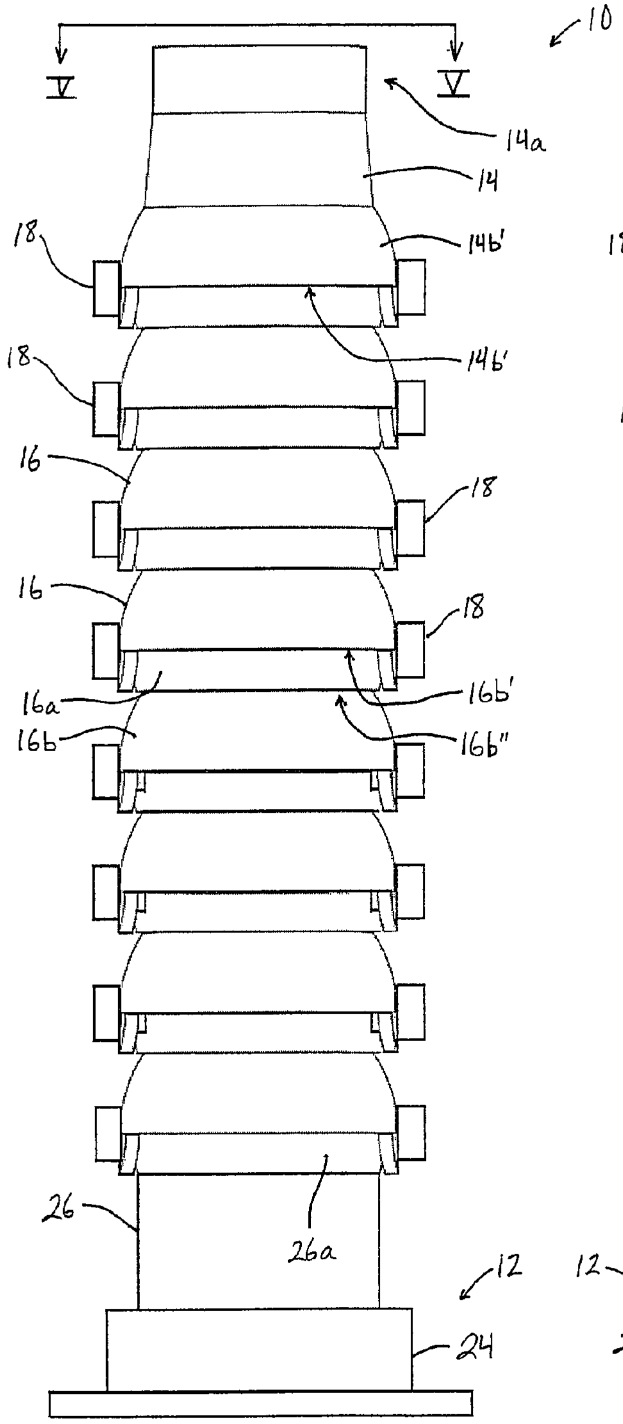
FIG. 4 is an elevation view of the monitor in a raised position.

Actuator 20 is pivotally coupled to mounting element 30 at base member 26, and is further coupled to mounting element 32 at outlet 14. Extension and retraction of actuator 20 causes outlet 14 and hollow members 16 to pivot relative to one another at joints 18 and move relative to base 12 in a substantially vertical plane. In this manner, the fluid passage or fluid path through the flexible monitor body may have a varying radius of curvature. For example, when actuator 20 is fully retracted, actuator mounting elements 30, 32 are drawn toward one another to form a relatively small radius of curvature so that monitor 10 is in a relatively compact stowage configuration and/or may direct fluid downwardly (FIGS. 1-3). When actuator 20 is extended, actuator mounting elements 30, 32 are urged away from one another to direct outlet 14 upwardly, and may be extended to direct fluid substantially vertically, as best seen in FIGS. 4 and 5. When actuator 20 is further extended, the outlet may be aimed at least somewhat in a direction opposite to the aiming direction when actuator 20 is retracted. Thus, the actuator may be operable to extend outlet 14 substantially beyond vertical or backwards, and/or to retract or lower the outlet substantially below approximately 45 degrees from a horizontal reference (or approximately 135 degrees from a vertical reference or the fluid input direction), such as for stowage. The monitor may thus be positioned at substantially any curve radius ranging between the radius at the stowage position and an infinite-radius curve or straight line fluid path. Alternatively, a linkage (not shown), such as a four-bar linkage or the like, may be used in combination with the actuator to enhance the mechanical leverage of the actuator, to improve the aiming precision, and/or to increase the effective vertical range of motion of monitor 10.

Actuator 20 may comprise an electric actuator, a hydraulic actuator, a ball screw actuator, a manually-driven actuator, a belt or chain system, or the like, for example. Alternatively, a pivoting actuator may be provided to move outlet 14 relative to base member 26 by applying a moment force. Alternatively, each joint 18 may be equipped with a rotary actuator such as an electric or hydraulic motor. Actuator 20 may include a pivoting control (not shown) at one or both of mounting elements 30, 32, which pivoting control is driven by an electric or hydraulic motor to change the orientation of actuator 20 and thus change the position and orientation of outlet 14. Such a pivoting control may be selectively operated in combination with the linear adjustment of actuator 20, or operated independently. For example, the hollow members may define a fluid path having single bend in a first direction, while the outlet or a nozzle thereon is aimed by the pivoting control to define another bend in the fluid path in a second direction.

Optionally, and with reference to FIG. 6, a monitor 10' may include one or more actuators 20' pivotally coupled to adjacent hollow members 16' for pivoting the adjacent hollow members about their joints 18. For example, one of actuators 20' may be connected between each adjacent pair of hollow members to facilitate individual control over the orientation of each hollow member relative to the adjacent hollow member (or an outlet 14' or base member 26'). Thus, by extending or retracting each individual actuator 20' by a selected amount, such as via a controller or the like, the hollow members 16' may be adjusted to position the outlet 14' as desired, and/or to position the monitor body to define a fluid path having one or more curves.

Figure 7:
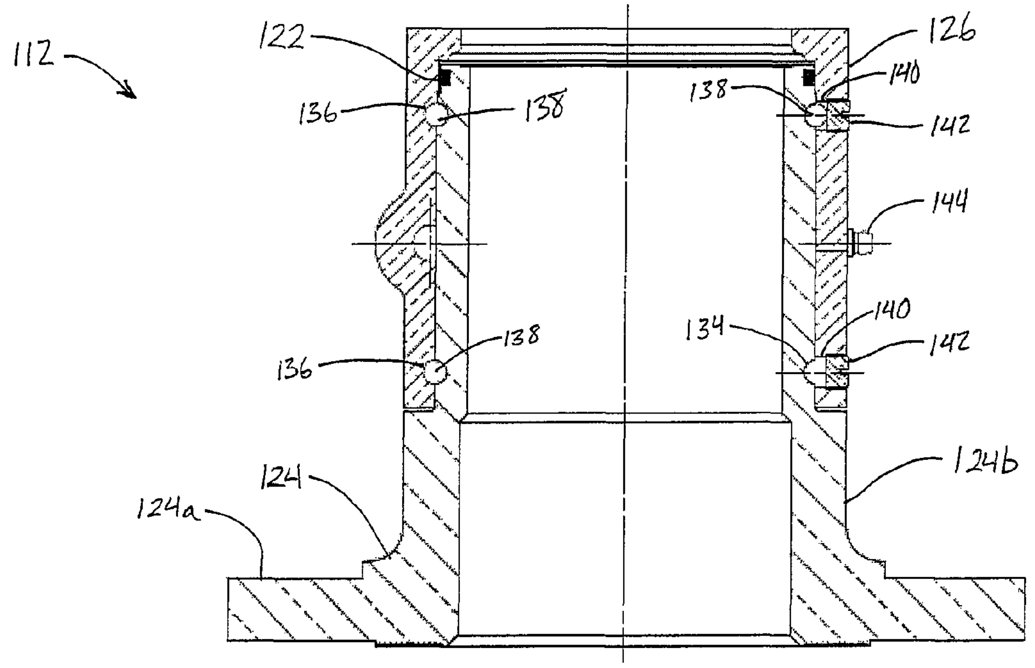
FIG. 7 is a cross-section view of an alternative embodiment base useful with a monitor of the present invention.

Optionally, and with reference to FIG. 7, the monitor may be mounted to a base 112 with a base flange 124 and a base member 126. Base flange 124 includes a generally flat radially-extending flange portion **124*a* and an upwardly-extending cylindrical portion 124*b*. Base member 126 is a generally cylindrical sleeve that mounts over the upwardly-extending cylindrical portion 124*b* of base flange 124. Cylindrical portion 124*b* of base flange 124 may include one or more annular grooves 134 along an outer surface to provide a portion of a bearing race. Base member 126 includes corresponding annular grooves 136 to provide another portion of the bearing race. Grooves 134, 136 cooperate to form annular passageways when base member 126 is assembled onto base flange 124, the passageways for receiving a plurality of ball bearings 138 to facilitate rotation of base member 126 relative to base flange 124. Access to the passageways may be provided through access holes 140 in base member 126, the access holes being selectively closeable with set screws 142 or the like. Optionally, a grease fitting 144 may be provided at base member 126 to facilitate the introduction of lubricants between base member 126 and base flange 124, and onto bearings 138. A seal 122 substantially prevents fire-fighting fluid from entering between base flange 124 and base member 126**.

Figure 8:
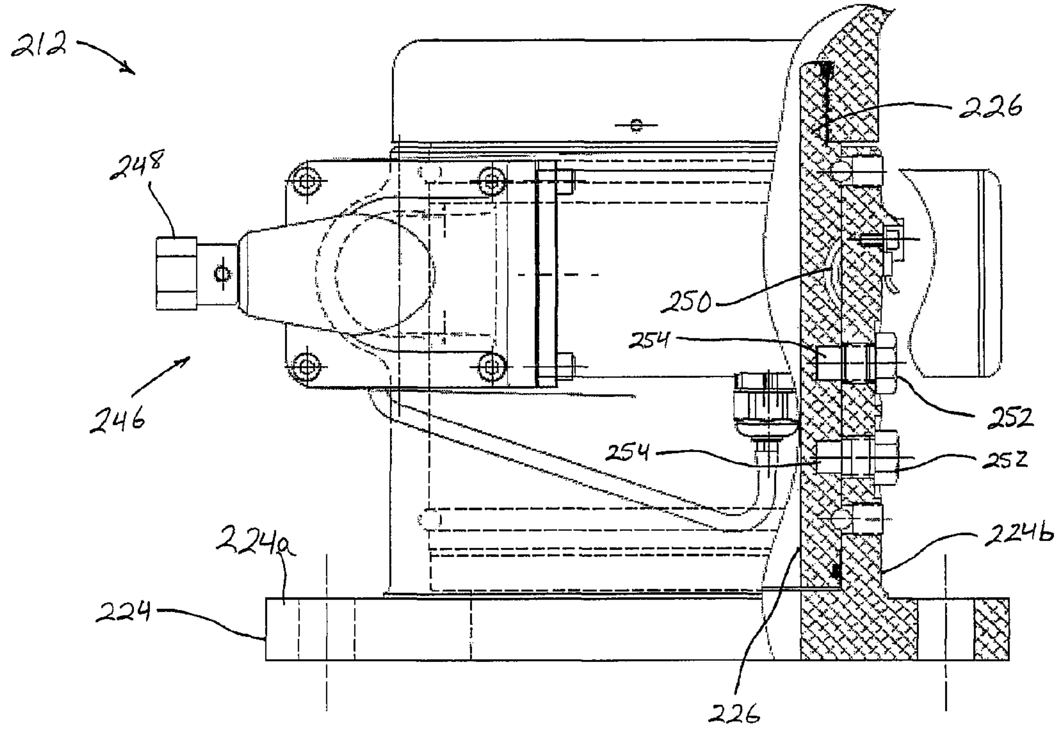
FIG. 8 is a partial sectional view of another alternative embodiment base useful with a monitor of the present invention.

Optionally, and with reference to FIG. 8, the monitor may be mounted to another embodiment of a base 212 that includes a base flange 224 and a base member 226. Base flange 224 includes a generally flat flange portion **224*a* and an upwardly-extending cylindrical portion 224*b*. Base member 226 is a generally cylindrical sleeve that mounts inside the upwardly-extending cylindrical portion 224*b* of base flange 224. Base 212 includes a drive unit 246 for rotatably driving base member 226 relative to base flange 224. In the illustrated embodiment, drive unit 246 comprises an electric drive motor with a manual override knob 248. Drive unit 246 is mounted to base flange 224 and is operable to turn a worm (not shown) that engages a worm gear 250 in the outer surface of base member 226 to thereby rotatably drive base member 226. Override knob 248 may be rotated to manually drive the worm and rotate base member 226. Base member 226 may be rotated through 360 degrees about a vertical axis via drive unit 246 or, optionally, may have its rotation limited by one or more stops 252 that are inserted through base flange 224 and into channels 254 in the outer surface of base member 226. Drive unit 246** may include an electric motor, a hydraulic motor, or the like. Suitable drive units are more fully described in commonly assigned U.S. Pat. No. 6,994,282, which is hereby incorporated herein by reference in its entirety.

Optionally, a tiller handle or a manual hand wheel may be provided at any of base members 26, 126, 226 for rotating the base member. Other drive units that may be suitable for use to rotatably drive the monitor include a fire-fighting monitor with remote control such as that disclosed in commonly assigned U.S. Pat. No. 7,191,964, which is hereby incorporated herein by reference in its entirety.

Accordingly, the present invention provides a fire-fighting monitor with a flow-efficient fluid path, a large range of flexibility of the monitor in a vertical plane, a relatively small stowage size, and 360 degree rotational capability.

While several forms of the invention have been shown and described, other forms will now be apparent to those skilled in the art. For example, the monitor may be mounted to a substantially vertical surface such that fluid flow through the base is substantially horizontal. Optionally, monitor 10 may be oriented in substantially any orientation on a vehicle, or on a portable mount or stand or the like. In the illustrated embodiment, monitor 10 includes seven hollow members 16 arranged between base member 26 and outlet 14. However, it will be appreciated that additional hollow members may be provided to increase the length and/or to increase the degree of flexibility of the monitor. Similarly, hollow members may be removed to reduce the length and degree of flexibility as desired. Optionally, while the pivot axes of the joint are illustrated as being substantially parallel, the pivot axes of the joints may be non-parallel, such that the flexible monitor forms a helical shape, or other curved shape, when in a curved or stowed position.

Therefore, it will be understood that the embodiments shown in the drawings and described above are merely for illustrative purposes, and are not intended to limit the scope of the invention, which is defined by the claims that follow, as interpreted under their principles of patent law including the doctrine of equivalents.

The embodiments of the invention in which an exclusive property is claimed are defined as follows:

1. A fire-fighting monitor comprising:

a rotatable base;

an outlet;

a plurality of hollow members connected in series between said base and said outlet to provide a flexible fluid path;

one or more joints at said hollow members;

wherein each of said hollow members has a ball portion and a socket portion, said socket portions being adapted to receive said ball portions; and wherein said base provides a fixed axis of rotation for said hollow members, and wherein said hollow members are repositionable to thereby reconfigure said fluid path from a substantially straight fluid path extending through said base substantially along said axis of rotation and through said outlet to a curved fluid path extending from said base to said outlet.

2. The fire-fighting monitor of claim 1, wherein said joints comprise hinges or ball-joints.

3. The fire-fighting monitor of claim 1, further comprising a seal at each of said socket portions of said hollow members for sealingly engaging said ball portions of said hollow members for a substantially fluid-tight seal between adjacent hollow members.

4. The fire-fighting monitor of claim 1, further comprising an actuator adapted to pivot said hollow members relative to one another at said joints.

5. The fire-fighting monitor of claim 4, wherein said actuator comprises a first end coupled to said base and a second end coupled to said outlet, wherein said actuator is actuatable to move said outlet relative to said base.

6. The fire-fighting monitor of claim 5, wherein said actuator comprises a linear actuator.

7. A fire-fighting monitor comprising:

a base;

an outlet;

a plurality of hollow members connected in series between said base and said outlet to provide a flexible fluid path; and one or more joints at said hollow members;

an actuator adapted to pivot said hollow members relative to one another at said joints;

wherein each of said hollow members has a ball portion and a socket portion, said socket portions being adapted to receive said ball portions; and wherein said actuator is coupled between adjacent ones of said hollow members.

8. The fire-fighting monitor of claim 7, wherein said base comprises a rotatable base.

9. The fire-fighting monitor of claim 8, wherein said base comprises a drive unit for rotatably driving said monitor.

10. A fire-fighting monitor comprising:

a flexible body forming an inlet and an outlet, said flexible body comprising a plurality of joints, said joints adapted to limit movement of said flexible body to substantially parallel pivot axes;

an actuator coupled between said inlet and said outlet;

a base at said inlet of said flexible body, said base comprising a fixed portion for mounting said flexible body;

a nozzle at said outlet; and wherein said actuator is operable to pivot said flexible body to reposition said nozzle relative to said inlet between a configuration defining a substantially straight fluid path extending through said fixed portion of said base and through said nozzle, and a configuration defining a curved fluid path extending from said base to said nozzle.

11. The fire-fighting monitor of claim 10, wherein said flexible body comprises a plurality of hollow members pivotally connected to one another in series between said inlet and said outlet.

12. The fire-fighting monitor of claim 10, wherein said actuator is extendable and retractable.

13. The fire-fighting monitor of claim 12, wherein said actuator is extendable to form the substantially straight fluid path through said monitor.

14. The fire-fighting monitor of claim 12, where said actuator is retractable until said outlet is oriented at least about 135 degrees from said inlet.

15. The fire-fighting monitor of claim 10, wherein said base comprises a rotatable portion coupled to said flexible body.

16. A fire-fighting monitor comprising:

a base comprising a fixed portion and a rotatable portion;

a flexible body extending from said base and forming an inlet and an outlet, said flexible body comprising a plurality of substantially parallel pivot axes and defining a fluid path;

an actuator coupled between said inlet and said outlet; and a nozzle at said outlet;

wherein said rotatable portion of said base provides an axis of rotation for said flexible body, and wherein said actuator is operable to pivot said flexible body and reposition said nozzle relative to said inlet to thereby reconfigure said fluid path from a substantially straight fluid path extending through said fixed and rotatable portions of said base and through said nozzle to a curved fluid path extending from said base to said nozzle.

17. The fire-fighting monitor of claim 16, wherein said flexible body comprises a plurality of hollow members pivotally connected to one another in series between said inlet and said outlet.

18. The fire-fighting monitor of claim 16, wherein said actuator is extendable to generally increase the radius of the curved fluid path and retractable to generally decrease the radius of the curved fluid path.

19. The fire-fighting monitor of claim 16, wherein said actuator is operable to pivot said flexible body to thereby define a fluid path having two or more curves.

20. The fire-fighting monitor of claim 1, wherein said base comprises a drive unit for rotatably driving said monitor.

21. The fire-fighting monitor of claim 7, wherein said actuator is operable to pivot said flexible body and reposition said outlet relative to said inlet to thereby reconfigure said fluid path from a substantially straight fluid path extending through said base and through said outlet to a curved fluid path extending from said base to said outlet.

22. The fire-fighting monitor of claim 7, wherein said actuator comprises a plurality of actuators coupled between respective adjacent ones of said hollow members, and wherein said actuators are operable to pivot said hollow members relative to one another to configure the flexible fluid path to define one or more curves.

* * * * *